(12) United States Patent
Wu et al.

(10) Patent No.: US 11,592,912 B1
(45) Date of Patent: Feb. 28, 2023

(54) CLICKPAD WITH PRELOADED CONTACT FORCE FOR AN INFORMATION HANDLING SYSTEM

(71) Applicant: Dell Products L.P., Round Rock, TX (US)

(72) Inventors: Jing-Tang Wu, Xizhi District (TW); Shih-Wei Yang, Luzhu District (TW); Chia-Chi Ho, Guishan (TW); Ya-Chen Tsai, Sindian District (TW)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/457,242

(22) Filed: Dec. 1, 2021

(51) Int. Cl.
*G09G 5/00* (2006.01)
*G06F 3/0354* (2013.01)

(52) U.S. Cl.
CPC .................. *G06F 3/03547* (2013.01)

(58) Field of Classification Search
CPC .... G06F 1/169; G06F 1/1692; G06F 3/03547; G06F 3/041
See application file for complete search history.

(56) References Cited

U.S. PATENT DOCUMENTS

| | | | | |
|---|---|---|---|---|
| 8,139,347 | B2 * | 3/2012 | Chiang | G06F 1/169 361/679.55 |
| 9,710,087 | B1 * | 7/2017 | Jayaraj | G06F 3/041 |
| 10,120,515 | B1 * | 11/2018 | Ghali | G02F 1/133553 |
| 10,241,377 | B1 * | 3/2019 | Wang | H01L 27/1218 |
| 2010/0103611 | A1 * | 4/2010 | Yang | G06F 1/169 361/679.55 |
| 2010/0300772 | A1 * | 12/2010 | Lee | G06F 3/03547 200/329 |
| 2016/0170250 | A1 * | 6/2016 | Ghali | G06F 1/1643 29/842 |
| 2017/0038801 | A1 * | 2/2017 | Lee | G06F 3/041 |
| 2017/0147036 | A1 * | 5/2017 | Mathew | G02F 1/133514 |
| 2017/0176835 | A1 * | 6/2017 | Gupta | G02B 6/0036 |
| 2017/0242506 | A1 * | 8/2017 | Patel | G06F 3/041 |

* cited by examiner

*Primary Examiner* — Joe H Cheng
(74) *Attorney, Agent, or Firm* — Norton Rose Fulbright US LLP

(57) ABSTRACT

Clickpad structures may be attached to surfaces of an information handling system using material stacks comprising an elastic material, such as a sponge, which can preload a force on the clickpad surface. The preloaded force reduces a gap between the clickpad switch and contact point, which reduces instability, rattling, and other negative experiences with the clickpad surface experienced by a user. According to an embodiment, an input device for an information handling system includes a clickpad surface having a first side configured to receive user input and a second side opposite the first side; a first coupling stack comprising a first elastic material with a first thickness; and a second coupling stack comprising a second elastic material with a second thickness, wherein each of the coupling stacks is attached to the clickpad surface and a surface of the information handling system by adhesives.

20 Claims, 7 Drawing Sheets

| | Convertional Design | | Embodiments of this Disclosure | |
|---|---|---|---|---|
| | Test 1 | Test 2 | Test 1 | Test 2 |
| Deformation | 0 | 0.3 | 0 | 0.3 |
| Top | 0.1 | 0.1 | 0.1 | 0.1 |
| Left | 0.15 | 0.2 | 0.05 | 0.05 |
| Right | 0.15 | 0.2 | 0.1 | 0.1 |
| Lower Right | 0.2 | 0.2 | 0.1 | 0.1 |
| Lower Left | 0.25 | *0.5* | 0.1 | 0.1 |

CLICKPAD WITH PRELOADED CONTACT FORCE FOR AN INFORMATION HANDLING SYSTEM

FIELD OF THE DISCLOSURE

The instant disclosure relates to information handling systems. More specifically, portions of this disclosure relate to input devices, such as click pads, for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some hardware components for an information handling are input devices, as part of a human-machine interface, that receive user input for processing by the information handling system. One such input device is a clickpad. Clickpads have areas, unmarked or marked, for left and right clicking. To right-click using a clickpad, a user may press the bottom right corner or surrounding area. To left-click using a clickpad, a user may press anywhere else on the clickpad, such as by pressing the bottom left corner.

SUMMARY

Clickpad structures may be attached to surfaces of an information handling system using material stacks comprising an elastic material, such as a sponge, which can preload a force on the clickpad surface. The preloaded force reduces a gap between the clickpad switch and contact point, which reduces instability, rattling, and other negative experiences with the clickpad surface experienced by a user. According to an embodiment, an input device for an information handling system includes a clickpad surface having a first side configured to receive user input and a second side opposite the first side; a first coupling stack comprising a first elastic material with a first thickness; and a second coupling stack comprising a second elastic material with a second thickness, wherein each of the coupling stacks is attached to the clickpad surface and a surface of the information handling system by adhesives.

According to one embodiment, an apparatus, such as an input/output device, which in some embodiments may be a click-pad module of an information handling system, may include a clickpad surface having a first side configured to receive user input and a second side opposite the first side; a first coupling stack comprising a first elastic material and a first adhesive, the first adhesive coupled to the second side of the clickpad surface; a second coupling stack comprising a second elastic material and a second adhesive, the second adhesive coupled to the second side of the clickpad surface, wherein the first elastic material has a different thickness than the second elastic material, and wherein the first coupling stack and the second coupling stack have surface areas smaller than a surface area of the clickpad surface.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

These example embodiments describe and illustrate various clickpads of an information handling system with improved user characteristics, such as reduced floating and/or rattling issues and/or better trigger force balance. These characteristics improve the user experience by providing increased consistency in receiving user input. For example, the user may be more confident that certain applications of force to the clickpad will result in known responses from the information handling system.

Figure 1A:
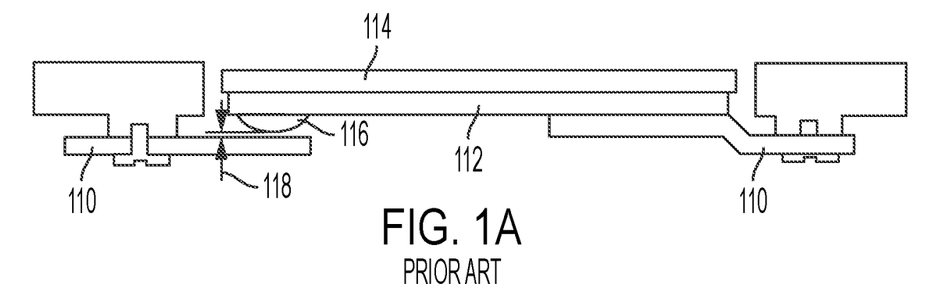
FIG. 1A is a cross-sectional view of a clickpad illustrating a gap between switch and contact surface.

Poor assembly of clickpads and incorporation of the clickpads into information handling systems can create poor user experiences, such as surface floating, surface rattling, surface steps, and trigger force unbalance. One conventional clickpad configuration is shown in FIG. 1A. FIG. 1A is a cross-sectional view of a clickpad illustrating a gap between switch and contact surface. A clickpad surface 114 is coupled to a clickpad printed circuit board (PCB) 112. The PCB 112 is mounted to a metal bracket 110 on one side and has a switch 116 separated by a gap 118 from another metal bracket 110. A palm rest around the clickpad may be attached to the metal bracket 110. When a user presses down on the clickpad surface 114, the switch 116 makes contact to metal bracket 110 to create a signal that can be interpreted by the information handling system as a click, either a left-click or right-click. The gap 118 may be 0.1 mm, which provides for assembly tolerance and manufacturing tolerance.

Figure 1B:
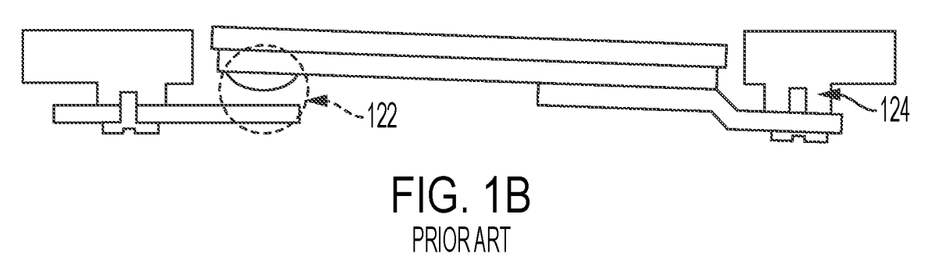
FIG. 1B is a cross-sectional view of a clickpad illustrating a clickpad with a slanted bracket.
Figure 1C:
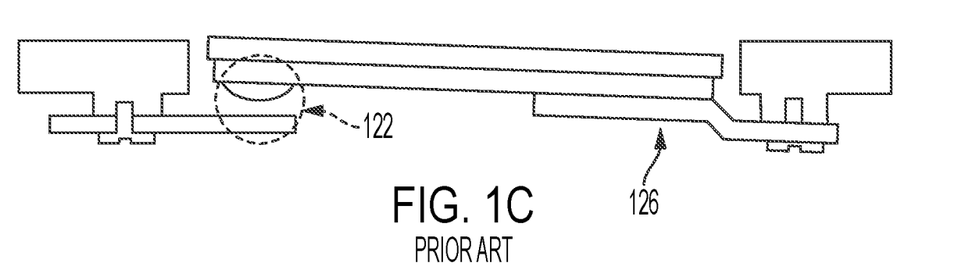
FIG. 1C is a cross-sectional view of a clickpad illustrating a clickpad with bracket deformation.

Assembly problems may result in issues involving the gap 118. For example, poor assembly may result in a slanted bracket as shown in FIG. 1A. FIG. 1B is a cross-sectional view of a clickpad illustrating a clickpad with a slanted bracket. The slanted bracket, such as may result from incorrect screw placement, places the clickpad surface at an angle creating a larger gap 122 as well as an unlevel surface. As another example, poor assembly may result in a deformed metal bracket shown in FIG. 1C. FIG. 1C is a cross-sectional view of a clickpad illustrating a clickpad with bracket deformation. Deformed metal bracket 126 likewise creates a larger gap 122 and an unlevel surface.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

According to some embodiments, reducing a gap between switch and bracket to zero may reduce issues resulting from unlevel clickpad surfaces. However, different assembly techniques and attachment structures are needed to provide tolerances and facilitate assembly of the clickpad and installation into an information handling system. Some embodiments may include two coupling stacks of different heights attached to the clickpad to provide tolerances and assist in assembly of the clickpad into an information handling system. One example structure with two coupling stacks of different heights is shown in FIG. 2.

Figure 2:
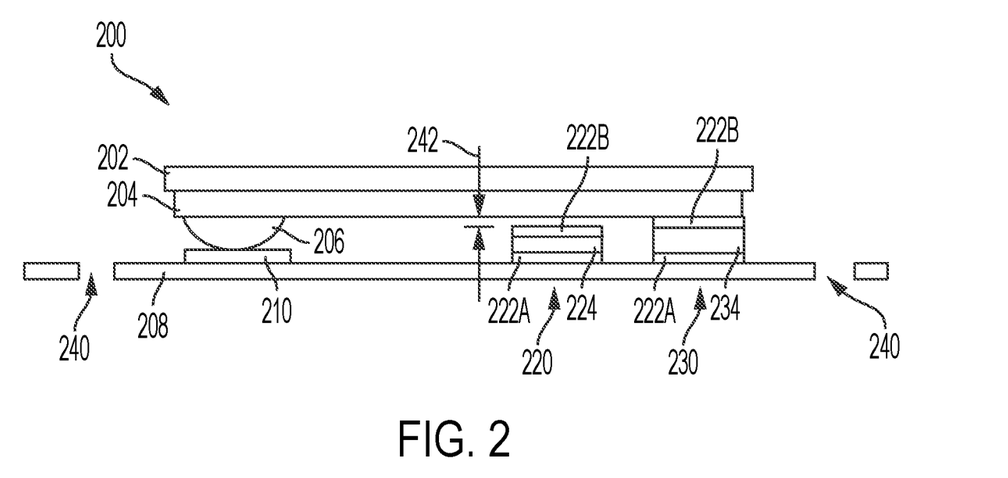
FIG. 2 is a cross-sectional view of a clickpad with two coupling stacks configured to attach the clickpad to a surface according to some embodiments of the disclosure.

FIG. 2 is a cross-sectional view of a clickpad with two coupling stacks configured to attach the clickpad to a surface according to some embodiments of the disclosure. A clickpad structure 200 may include a clickpad surface 202, which may have a Mylar surface, and a clickpad PCB 204 coupled to the clickpad surface 202. A switch 206 may be coupled to the PCB 204, such as near an edge of the clickpad structure 200. The clickpad structure may attach to a surface, such as metal bracket 208, through first coupling stack 220 and second coupling stack 230. Each of the coupling stacks may include, for example, a rigid elastic material with adhesive on both sides of the rigid elastic material to adhere the rigid elastic material to the clickpad surface 202 and to the surface below. For example, first coupling stack 220 may include rigid elastic material 224 coupled to clickpad PCB 204 through adhesive 222B and to the metal bracket 208 through adhesive 222A. Second coupling stack 230 may include rigid elastic material 234 coupled to clickpad PCB 204 through adhesive 222B and to the metal bracket 208 through adhesive 222A. Examples of the rigid elastic material include a sponge or prone material. The first rigid elastic material 224 may have a different thickness than second rigid elastic material 234, such that a gap 242 separates the first coupling stack 220 from the clickpad surface 202. The difference in thicknesses, reflected in the gap 242 may be chosen to apply a specific force to the clickpad surface 202, such a gap between switch 206 and a contact 210 is reduced or eliminated. The contact 210 on the metal bracket 208 may be a mylar-based or rubber-based material. A screw hole 240 may be used to attach the metal bracket 208 to another surface, such as within a chassis of an information handling system.

Figure 3:
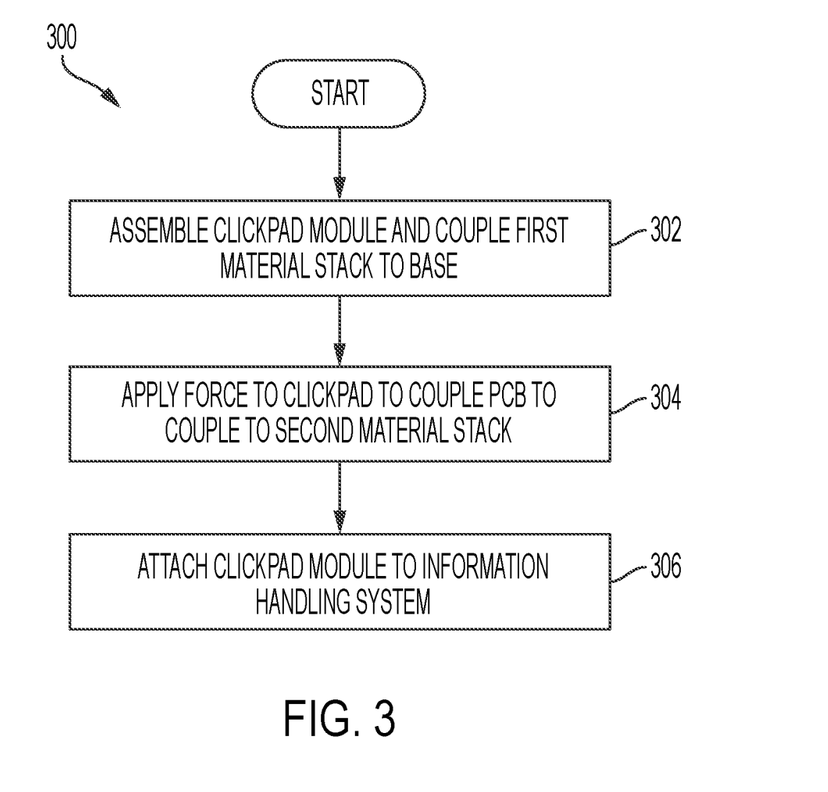
FIG. 3 is a flow chart illustrating a method for assembling an information handling system with a clickpad according to embodiments of this disclosure.
Figure 4A:
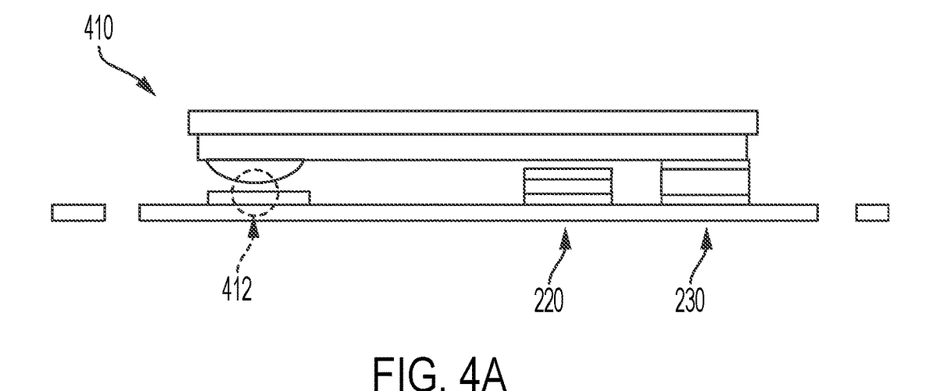
FIG. 4A is a cross-sectional view of a clickpad after assembly according to some embodiments of the disclosure.
Figure 4B:
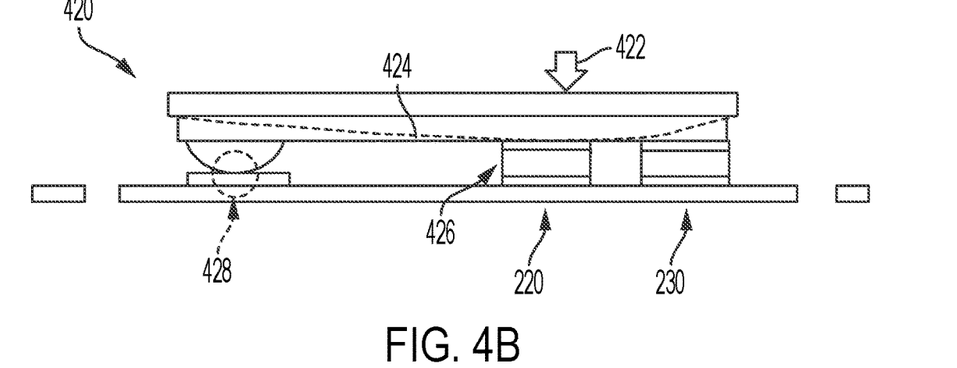
FIG. 4B is a cross-sectional view of a clickpad after application to a surface according to some embodiments of the disclosure.
Figure 4C:
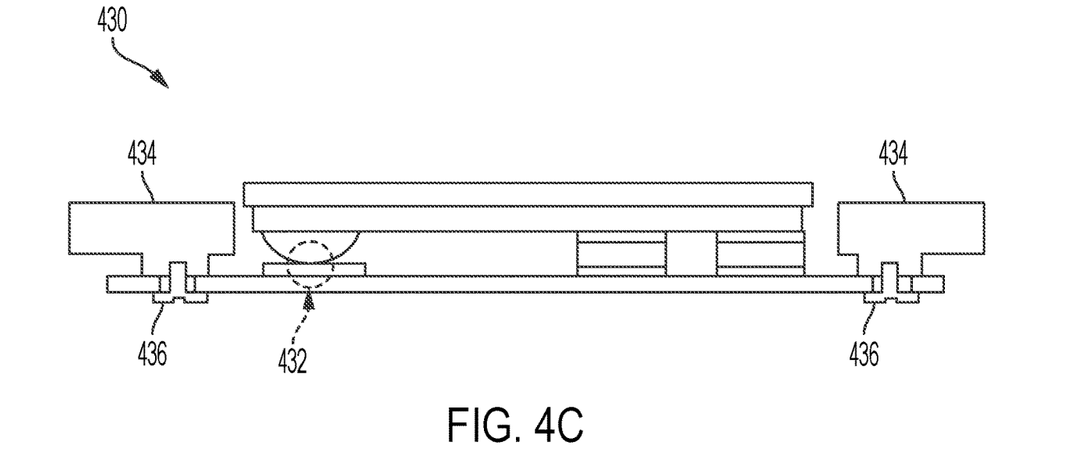
FIG. 4C is a cross-sectional view of a clickpad after attachment to additional parts of an information handling system according to some embodiments of the disclosure.

FIG. 3 is a flow chart illustrating a method for assembling an information handling system with a clickpad according to embodiments of this disclosure. Illustrations of various stages of the assembly method performed using a clickpad structure 200 as shown in FIG. 2 are shown in FIG. 4A, FIG. 4B, and FIG. 4C, although the assembly method may performed to install a different clickpad structure with two coupling stacks. The method 300 of FIG. 3 may be used, for example, when installing a clickpad as an input device as part of a portable information handling system, such as a laptop.

At block 302, a clickpad module is assembled with first and second material stacks for coupling the clickpad module to a surface. The first material stack is coupled to a base surface to at least partially affix the clickpad module to the base surface. FIG. 4A is a cross-sectional view of a clickpad after assembly according to some embodiments of the disclosure. In configuration 410, the coupling stack 230 is adhered to the base surface and to the clickpad surface 202. The thickness of the rigid elastic material in coupling stack 230 is large enough such that a gap 412 exists between the switch 206 and contact 210.

At block 304, the clickpad module is depressed with a downward force to adhere coupling stack 220 to the clickpad surface 202. FIG. 4B is a cross-sectional view of a clickpad after application to a surface according to some embodiments of the disclosure. The downward force 422 deforms 424 the clickpad structure including surface 202 and PCB 204 such with enough deformation to attach 426 the clickpad surface 202 to the coupling stack 220. The thickness of the coupling stack 220, which is proportional to the thickness of the rigid elastic material in the coupling stack 220, is configured such that contact between the clickpad surface 202 and the coupling stack 220 also results in contact between the switch 206 and contact 210. This results in a zero-gap or a reduce-gap configuration between the switch 206 and contact 210 for the clickpad structure 420.

When the downward force 422 is applied, the rigid elastic material, such as a sponge, will extend and generate a slight force to drop down, which causes a preloading of force to maintain contact between the switch 206 and contact 210. This force is less than a downward force that triggers the switch 206 (e.g., a switch trigger force of 165 g). The reduced or eliminated gap reduces or eliminates floating and/or rattling issues resulting from undesirable movement and freedom of the clickpad surface 202 when a side with the switch 206 is not resting on another surface but has a gap that allows the clickpad surface 202 to move.

At block 306, the clickpad module is attached to the information handling system. FIG. 4C is a cross-sectional view of a clickpad after attachment to additional parts of an information handling system according to some embodiments of the disclosure. For example, the surface of metal bracket 208 may be coupled to a chassis of an information handling system that includes palm rest 434. Screws 436 may be used to attach the metal bracket 208 to information handling system components, such as palm rest 434.

Figure 5:
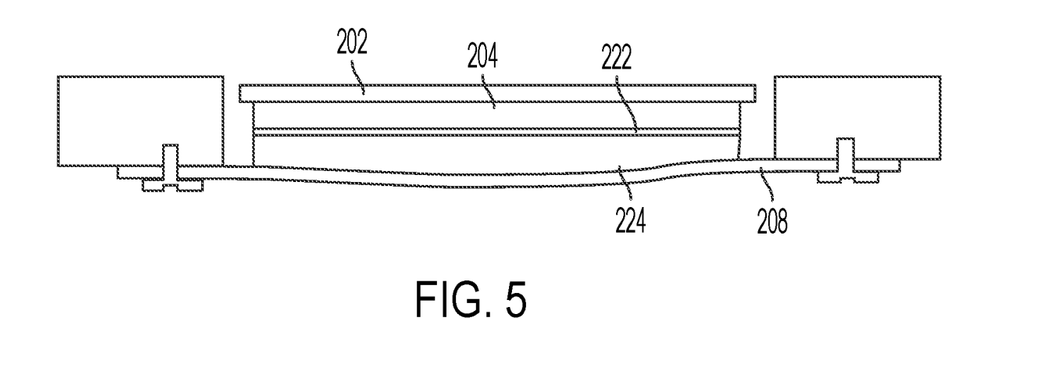
FIG. 5 is a cross-sectional view of a clickpad according to some embodiments of the disclosure fitting to a deformed surface.

One benefit of the coupling stack with rigid elastic materials is shown in the example of FIG. 5. FIG. 5 is a cross-sectional view of a clickpad according to some embodiments of the disclosure fitting to a deformed surface. A rigid elastic material 224 can flex and reshape to match a deformation of a surface below the clickpad surface 202, such as deformation in metal bracket 208. The flexibility of the material stack, at least through the use of the rigid elastic material 224, can reduce or avoid distortion of the clickpad module due to surface deformation. This may allow a parallel top surface between the clickpad surface 202 and the surrounding palm-rest, which improves the user experience. This may also reduce imbalance in the trigger force for activating the switch 206.

Figure 6A:
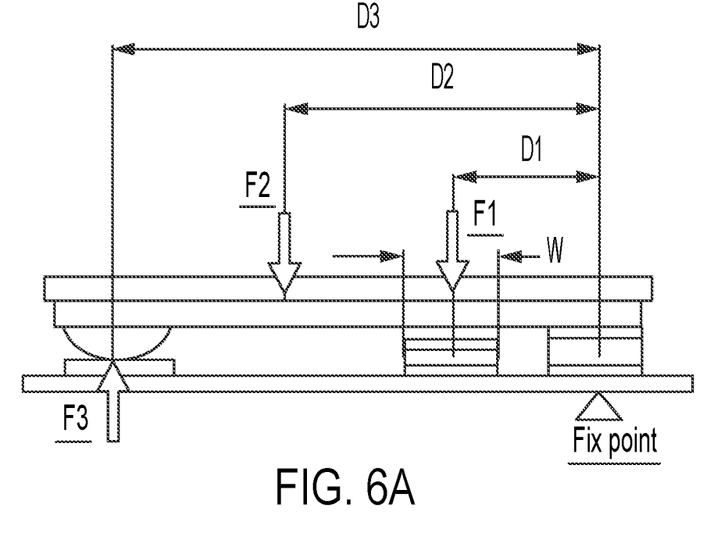
FIG. 6A is a cross-sectional view illustrating various dimensions of a clickpad according to some embodiments of the disclosure.
Figure 6B:
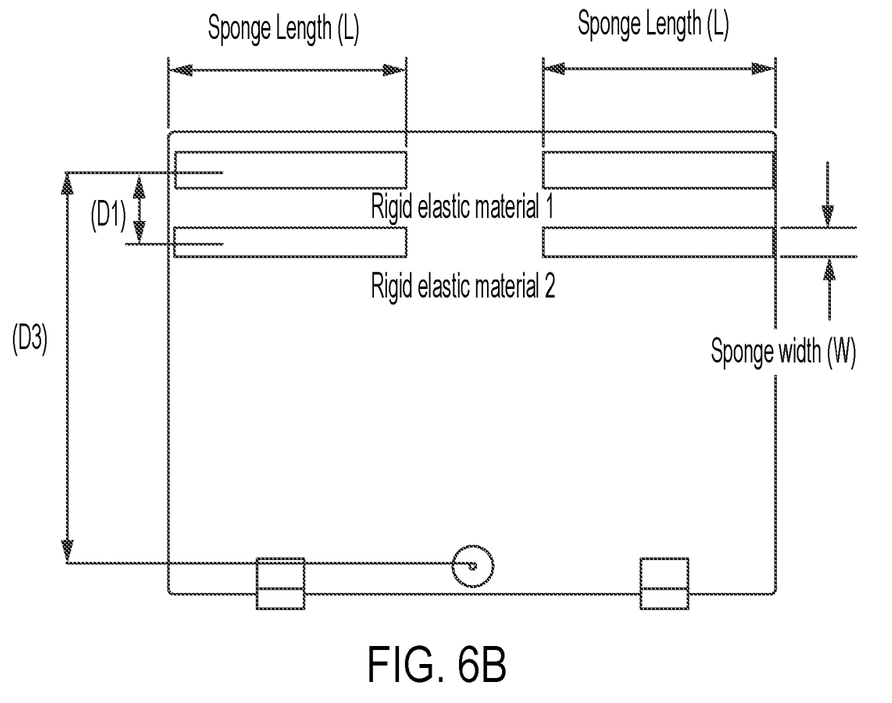
FIG. 6B is a top-down view illustrating various dimensions of a clickpad according to some embodiments of the disclosure.

The clickpad structure may be configured to provide specific force preload amounts based on the ratio of certain dimensions of the structure. Certain dimensions are noted on cross-sectional and top-down views of a clickpad structure in FIG. 6A and FIG. 6B. FIG. 6A is a cross-sectional view illustrating various dimensions of a clickpad according to some embodiments of the disclosure. FIG. 6B is a top-down view illustrating various dimensions of a clickpad according to some embodiments of the disclosure. A fix point indicates a point where the clickpad surface is initially attached with the coupling stack to a surface. The fix point may be a center of the attached coupling stack. A distance D1 is a distance from the fix point to the other coupling stack, such as a center point of the other coupling stack or another point of the other coupling stack corresponding to the location of fix point relative to the attached coupling stack. A distance D2 is a distance from the fix point to rigid elastic material. A distance D3 is a distance from the fix point to the switch 206. A length L is a length of a coupling stack, and a width W is a width of a coupling stack. In some embodiments, each of the coupling stacks may have the same length L and width W. In some embodiments, each of the coupling stacks may have different lengths L1, L2, L3, and L4 and different widths W1, W2, W3, and W4, although some length and width values may be equal.

F1, F2, and F3 illustrate forces acting on the clickpad structure. A force F1 is a force quantity corresponding to a downward force caused by the extending of the shorter coupling stack when adhered to the clickpad surface 202. That is, the rigid elastic material of the coupling stack may be stretched and have a natural internal resistance to the stretching that causes the coupling stack to pull down on the clickpad surface with force F1. A force F2 is a force quantity corresponding to a downward force caused by gravity pulling the weight of the clickpad surface and clickpad PCB, and other included parts in the clickpad structure. A force F3 is a force quantity corresponding to an upward force caused by the contact 210 in resisting the downward movement of switch 206. A clickpad may have a switch force, according to some embodiments, of between 1-2 N, between 1.2-1.6 N, or between 1.3-1.4 N+/−0.3 N.

The dimensions may be configured to satisfy values corresponding to the F1, F2, and F3 forces to provide improved user experience in operating the clickpad structure as an input device. For example, when (F1*D1)+(F2*D2)< (F3*D3), contact may be maintained between the switch 206 and the contact 210 without causing an inadvertent trigger of the switch 206. In some embodiments, this calculation may be performed to obtain size and location of coupling stacks in the clickpad structure.

Figure 7:
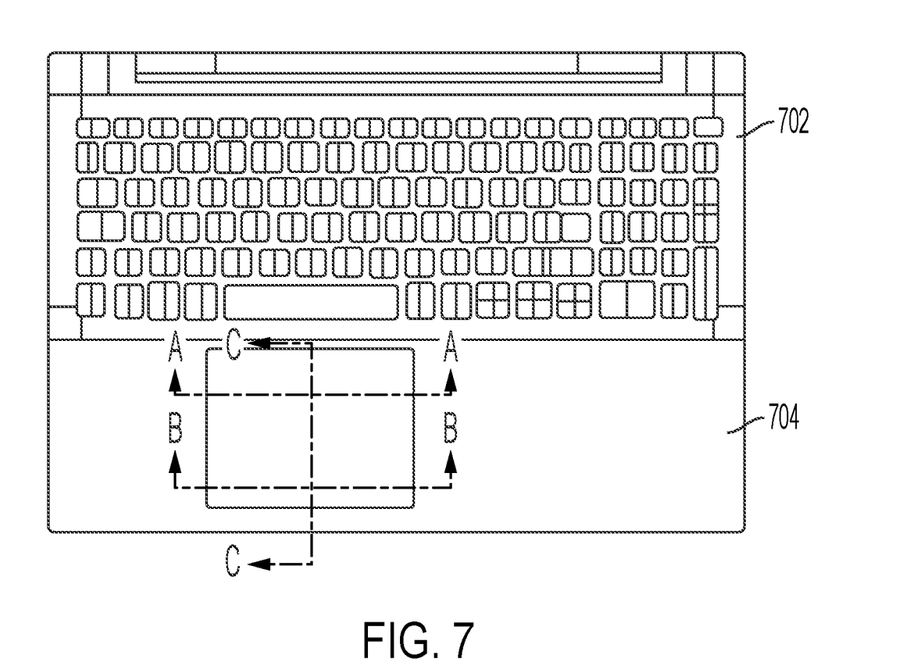
FIG. 7 is a top-down view illustrating a clickpad according to some embodiments of the disclosure installed in an information handling system.

The clickpad structure may be installed as part of an information handling system, such as a laptop computer or keyboard for attachment to a tablet computing device. An example of such an illustration is shown in FIG. 7. FIG. 7 is a top-down view illustrating a clickpad according to some embodiments of the disclosure installed in an information handling system. An information handling system chassis 702 may include a clickpad structure 704 positioned near a keyboard or other input device. User input to the clickpad structure 704 may be used to control a cursor or other object on a display screen. Several cross-sections A-A, B-B, and C-C are shown through the clickpad structure 704. The illustration of FIG. 2, FIG. 4A, FIG. 4B, FIG. 4C, and FIG. 6A are shown, for example, through cross-section C-C.

Figure 8:
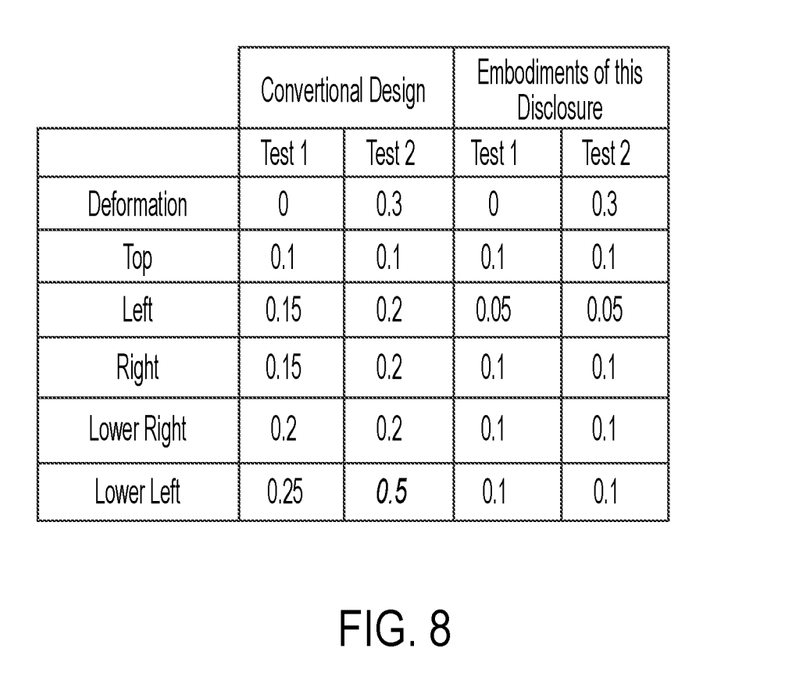
FIG. 8 is a table illustrating improved user characteristics of a clickpad according to some embodiments of the disclosure.

Measurements showing improvements in the user experience using the clickpad structure according to certain embodiments of the disclosure are shown in FIG. 8. FIG. 8 is a table illustrating improved user characteristics of a clickpad according to some embodiments of the disclosure. Two tests were performed on a conventional clickpad and compared with two tests performed on a clickpad structure according to an embodiment of this disclosure. A first test is performed with no deformation of the underlying metal bracket surface, and a second test is performed with 0.3 mm deformation of the underlying metal bracket surface. PSCS (ID) values are measured at several points (e.g., top, left, right, lower right, lower left) for each test deformation value for each of the conventional clickpad and clickpad structure according to an embodiment of this disclosure. Comparing Test 1 results between the conventional and embodiment generally show a reduction in the ID for the measurement points. Comparing Test 2 results between the conventional and embodiment generally show a reduction in the ID for the measurements.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 9:
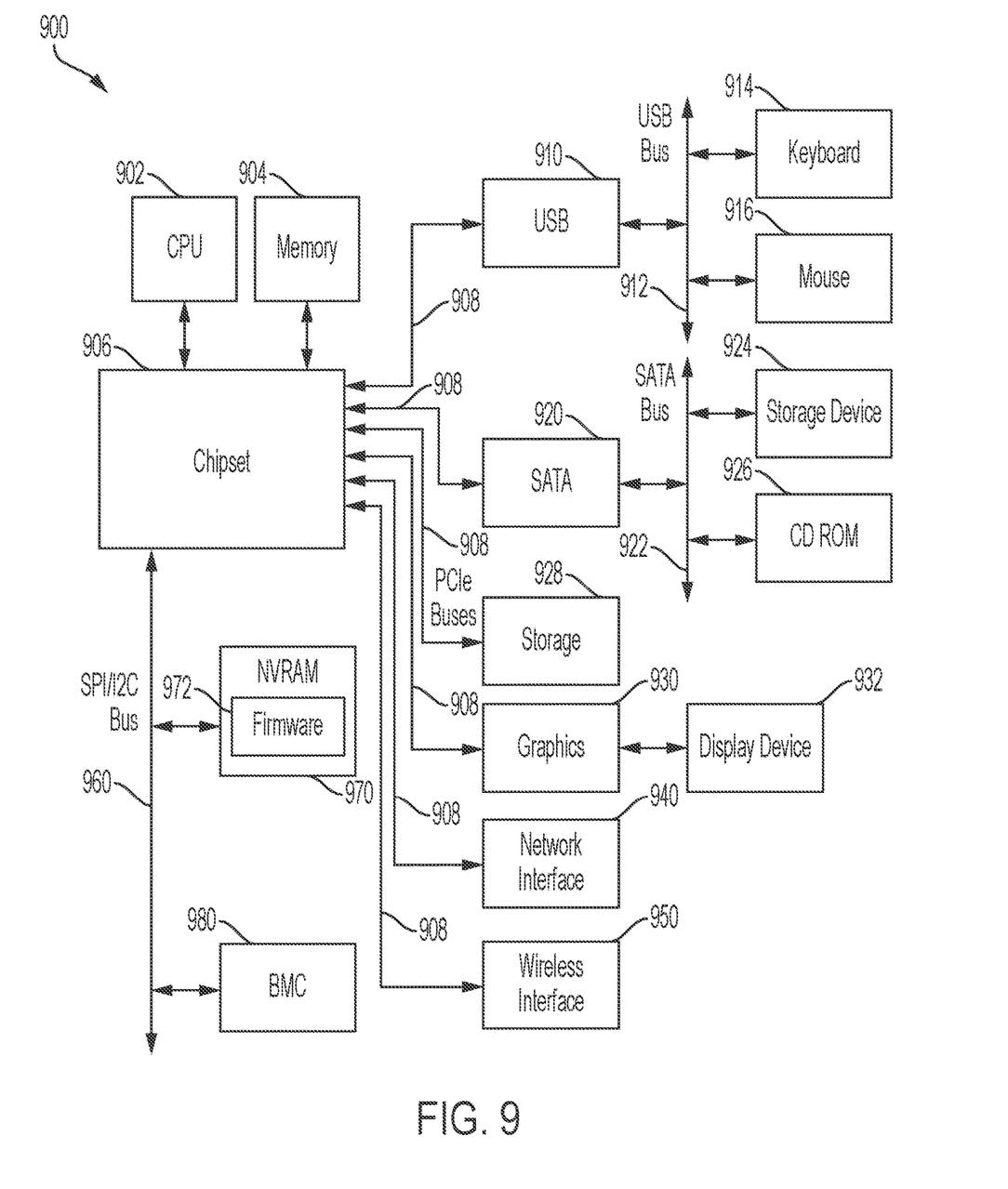
FIG. 9 is a schematic block diagram of an example information handling system according to some embodiments of the disclosure.

The clickpad may be incorporated with or coupled as an input device to an information handling system, such as the example system shown in FIG. 9. FIG. 9 illustrates an example information handling system 900. Information handling system 900 may include a processor 902 (e.g., a central processing unit (CPU)), a memory (e.g., a dynamic random-access memory (DRAM)) 904, and a chipset 906. In some embodiments, one or more of the processor 902, the memory 904, and the chipset 906 may be included on a motherboard (also referred to as a mainboard), which is a printed circuit board (PCB) with embedded conductors organized as transmission lines between the processor 902, the memory 904, the chipset 906, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 902, the memory 904, the chipset 906, and/or other components may be organized as a System on Chip (SoC).

The processor 902 may execute program code by accessing instructions loaded into memory 904 from a storage device, executing the instructions to operate on data also loaded into memory 904 from a storage device, and generate output data that is stored back into memory 904 or sent to another component. The processor 902 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 902 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 906 may facilitate the transfer of data between the processor 902, the memory 904, and other components. In some embodiments, chipset 906 may include two or more integrated circuits (ICs), such as a northbridge controller coupled to the processor 902, the memory 904, and a southbridge controller, with the southbridge controller coupled to the other components such as USB 910, SATA 920, and PCIe buses 908. The chipset 906 may couple to other components through one or more PCIe buses 908.

Some components may be coupled to one bus line of the PCIe buses 908, whereas some components may be coupled to more than one bus line of the PCIe buses 908. One example component is a universal serial bus (USB) controller 910, which interfaces the chipset 906 to a USB bus 912. A USB bus 912 may couple input/output components such as a keyboard 914 and a mouse 916, but also other components such as USB flash drives, or another information handling system. Another example component is a SATA bus controller 920, which couples the chipset 906 to a SATA bus 922. The SATA bus 922 may facilitate efficient transfer of data between the chipset 906 and components coupled to the chipset 906 and a storage device 924 (e.g., a hard disk drive (HDD) or solid-state disk drive (SDD)) and/or a compact disc read-only memory (CD-ROM) 926. The PCIe bus 908 may also couple the chipset 906 directly to a storage device 928 (e.g., a solid-state disk drive (SDD)). A further example of an example component is a graphics device 930 (e.g., a graphics processing unit (GPU)) for generating output to a display device 932, a network interface controller (NIC) 940, and/or a wireless interface 950 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example embodiment, chipset 906 may be directly connected to an individual end point via a PCIe root port within the chipset and a point-to-point topology as shown in FIG. 9.

The chipset 906 may also be coupled to a serial peripheral interface (SPI) and/or Inter-Integrated Circuit (I2C) bus 960, which couples the chipset 906 to system management components. For example, a non-volatile random-access memory (NVRAM) 970 for storing firmware 972 may be coupled to the bus 960. As another example, a controller, such as a baseboard management controller (BMC) 980, may be coupled to the chipset 906 through the bus 960. BMC 980 may be referred to as a service processor or embedded controller (EC). Capabilities and functions provided by BMC 980 may vary considerably based on the type of information handling system. For example, the term baseboard management system may be used to describe an embedded processor included at a server, while an embedded controller may be found in a consumer-level device. As disclosed herein, BMC 980 represents a processing device different from processor 902, which provides various management functions for information handling system 900. For example, an embedded controller may be responsible for power management, cooling management, and the like. An embedded controller included at a data storage system may be referred to as a storage enclosure processor or a chassis processor.

System 900 may include additional processors that are configured to provide localized or specific control functions, such as a battery management controller. Bus 960 can include one or more busses, including a Serial Peripheral Interface (SPI) bus, an Inter-Integrated Circuit (I2C) bus, a system management bus (SMBUS), a power management bus (PMBUS), or the like. BMC 980 may be configured to provide out-of-band access to devices at information handling system 900. Out-of-band access in the context of the bus 960 may refer to operations performed prior to execution of firmware 972 by processor 902 to initialize operation of system 900.

Firmware 972 may include instructions executable by processor 902 to initialize and test the hardware components of system 900. For example, the instructions may cause the processor 902 to execute a power-on self-test (POST). The instructions may further cause the processor 902 to load a boot loader or an operating system (OS) from a mass storage device. Firmware 972 additionally may provide an abstraction layer for the hardware, such as a consistent way for application programs and operating systems to interact with the keyboard, display, and other input/output devices. When power is first applied to information handling system 900, the system may begin a sequence of initialization procedures, such as a boot procedure or a secure boot procedure. During the initialization sequence, also referred to as a boot sequence, components of system 900 may be configured and enabled for operation and device drivers may be installed. Device drivers may provide an interface through which other components of the system 900 can communicate with a corresponding device. The firmware 972 may include a basic input-output system (BIOS) and/or include a unified extensible firmware interface (UEFI). Firmware 972 may also include one or more firmware modules of the information handling system. Additionally, configuration settings for the firmware 972 and firmware of the information handling system 900 may be stored in the NVRAM 970. NVRAM 970 may, for example, be a non-volatile firmware memory of the information handling system 900 and may store a firmware memory map namespace 900 of the information handling system. NVRAM 970 may further store one or more container-specific firmware memory map namespaces for one or more containers concurrently executed by the information handling system.

Information handling system 900 may include additional components and additional busses, not shown for clarity. For example, system 900 may include multiple processor cores (either within processor 902 or separately coupled to the chipset 906 or through the PCIe busses 908), audio devices (such as may be coupled to the chipset 906 through one of the PCIe busses 908), or the like. While a particular arrangement of bus technologies and interconnections is illustrated for the purpose of example, one of skill will appreciate that the techniques disclosed herein are applicable to other system architectures. System 900 may include multiple processors and/or redundant bus controllers. In some embodiments, one or more components may be integrated together in an integrated circuit (IC), which is circuitry built on a common substrate. For example, portions of chipset 906 can be integrated within processor 902. Additional components of information handling system 900 may include one or more storage devices that may store machine-executable code, one or more communications ports for communicating with external devices, and various input and output (I/O) devices, such as a keyboard, a mouse, and a video display.

In some embodiments, processor 902 may include multiple processors, such as multiple processing cores for parallel processing by the information handling system 900. For example, the information handling system 900 may include a server comprising multiple processors for parallel processing. In some embodiments, the information handling system 900 may support virtual machine (VM) operation, with multiple virtualized instances of one or more operating systems executed in parallel by the information handling system 900. For example, resources, such as processors or processing cores of the information handling system may be assigned to multiple containerized instances of one or more operating systems of the information handling system 900 executed in parallel. A container may, for example, be a virtual machine executed by the information handling system 900 for execution of an instance of an operating system by the information handling system 900. Thus, for example, multiple users may remotely connect to the information handling system 900, such as in a cloud computing configuration, to utilize resources of the information handling system 900, such as memory, processors, and other hardware, firmware, and software capabilities of the information handling system 900. Parallel execution of multiple containers by the information handling system 900 may allow the information handling system 900 to execute tasks for multiple users in parallel secure virtual environments.

The schematic flow chart diagram of FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although clickpads are described in embodiments above, the technique of applying a preloaded force to maintain contact between two points (such as a switch and switch point) may be applied in other embodiments to different shapes and different components within an information handling system. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
    a clickpad surface having a first side configured to receive user input and a second side opposite the first side;
    a first coupling stack comprising a first elastic material and a first adhesive, the first adhesive coupled to the second side of the clickpad surface; and
    a second coupling stack comprising a second elastic material and a second adhesive, the second adhesive coupled to the second side of the clickpad surface,
    wherein the first elastic material has a different thickness than the second elastic material, and
    wherein the first coupling stack and the second coupling stack have surface areas smaller than a surface area of the clickpad surface.

2. The apparatus of claim 1, wherein a thickness of the first elastic material is different from a thickness of the second elastic material.

3. The apparatus of claim 2, further comprising:
    a circuit board coupled to the second side of the clickpad surface, wherein the first adhesive of the first coupling stack and the second adhesive of the second coupling stack are coupled to the circuit board; and
    a switch trigger coupled to the circuit board.

4. The apparatus of claim 3, wherein the first coupling stack further comprises a third adhesive for coupling to a metal bracket, and the second coupling stack further comprises a fourth adhesive for coupling to the metal bracket, wherein the thickness of the first elastic material is configured to apply a force to the switch trigger to couple the switch trigger to a clickpad contact.

5. The apparatus of claim 3, further comprising:
    a bracket, wherein the clickpad surface is attached to the bracket through the third adhesive of the first coupling stack and the fourth adhesive of the second coupling stack;
    a palmrest coupled to the bracket; and
    a clickpad contact coupled to the bracket.

6. The apparatus of claim 5, wherein the first elastic material and the second elastic material conform to the bracket.

7. The apparatus of claim 5, wherein the clickpad surface is attached to the bracket such that there is no gap between the clickpad contact and the switch trigger.

8. An information handling system, comprising:
    a memory;
    a processor coupled to the memory;
    an input/output device coupled to the processor, the input/output device comprising:
        a clickpad surface having a first side configured to receive user input and a second side opposite the first side;
        a first coupling stack comprising a first elastic material and a first adhesive, the first adhesive coupled to the second side of the clickpad surface; and
        a second coupling stack comprising a second elastic material and a second adhesive, the second adhesive coupled to the second side of the clickpad surface,
        wherein the first elastic material has a different thickness than the second elastic material, and
        wherein the first coupling stack and the second coupling stack have surface areas smaller than a surface area of the clickpad surface.

9. The information handling system of claim 8, wherein a thickness of the first elastic material is different from a thickness of the second elastic material.

10. The information handling system of claim 8, further comprising:
    a circuit board coupled to the second side of the clickpad surface, wherein the first adhesive of the first coupling stack and the second adhesive of the second coupling stack are coupled to the circuit board; and
    a switch trigger coupled to the circuit board.

11. The information handling system of claim 10, wherein the first coupling stack further comprises a third adhesive for coupling to a metal bracket, and the second coupling stack further comprises a fourth adhesive for coupling to the metal bracket, wherein the thickness of the first elastic material is configured to apply a force to the switch trigger to couple the switch trigger to a clickpad contact.

12. The information handling system of claim 10, further comprising:
    a bracket, wherein the clickpad surface is attached to the bracket through the third adhesive of the first coupling stack and the fourth adhesive of the second coupling stack;
    a palmrest coupled to the bracket; and
    a clickpad contact coupled to the bracket.

13. The information handling system of claim 12, wherein the first elastic material and the second elastic material conform to the bracket.

14. The information handling system of claim 12, wherein the clickpad surface is attached to the bracket such that there is no gap between the clickpad contact and the switch trigger.

15. A method of assembling an information handling system, comprising:
    assemble a clickpad structure comprising a first material stack comprising a first elastic material;
    attach the clickpad structure to a surface over a second material stack by coupling the first material stack to the surface, the second material stack comprising a second elastic material; and
    apply a force to the clickpad structure to couple second material stack between the surface and the clickpad structure.

16. The method of claim 15, wherein applying a force to the clickpad structure deforms the clickpad structure to couple the second material stack between the surface and the clickpad structure.

17. The method of claim 15, wherein applying a force to the clickpad structure contacts a switch of the clickpad structure to a contact on the surface.

18. The method of claim 17, wherein after applying a force to the click pad structure, the second material stack exerts a force on the switch of the clickpad structure to decrease a distance between the switch and the contact on the surface.

19. The method of claim 18, wherein the second material stack exerts a force to the switch of the clickpad structure to maintain contact between the switch and the contact on the surface in the absence of user input to the clickpad structure.

20. The method of claim 18, wherein the force exerted by the second material stack is less than an activation force for triggering the switch of the clickpad structure.

* * * * *